EXAMINER.
D. Gilbert.
Vapor Burner.
Patented Mar. 29, 1834
8,121 X
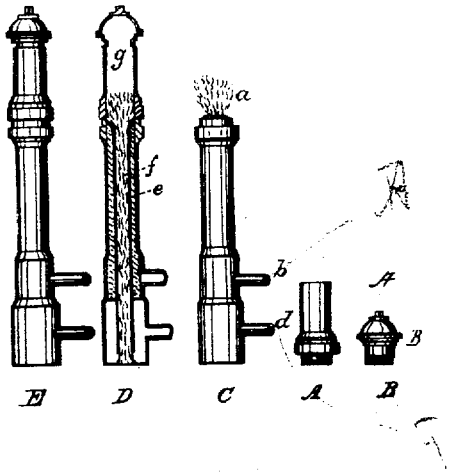
Turpentine enters thro' d; alcohol through b; Vapor of both burns together.
N. PETERS, PHOTO-LITHOGRAPHER, WASHINGTON, D. C.

Mar. 29. 1834  8121X  73.

Daniel Gilbert of Brattleboro State of Vermont,

Letters Patent,

The schedule referred to in these Letters Patent and making part of the same, containing a description in the words of the said Daniel Gilbert himself of his improvement in the Lamp To all to whom these presents shall come Daniel Gilbert of Brattleboro, in the county of Windham and State of Vermont sends Greeting Be it known that I the said Daniel Gilbert have invented constructed and made and applied to use a new and useful Lamp adapted to the use of turpentine & alcohol of commerce uniting them in a state of vapour specified in the words following viz I make the body of my Lamp of any convenient size, say six inches high and four inches diameter with a partition across it three inches from the bottom — The space above the partition I call the alcohol chamber and that below the turpentine chamber. from the bottom of the partition extends a tube half an inch diameter thro the top of the lamp which I call the partition tube from near the bottom of the lower chamber extends another tube within and through the partition tube rising about one inch above it which I call the turpentine tube inclosing the partition tube another tube called the alcohol tube extending from near the bottom of the alcohol chamber to the top of the turpentine tube and is firmly united with it at the top by packing or brazing, From the body of the lamp extends another tube one inch diameter rising about five inches above it and may extend to near the bottom of the alcohol chamber, which last tube I call the burner within the upper end of the burner I cut a female screw which is closed by a small screw leaving a flange or nut around its centre which male screw is hollow at each end to the flanch or nut & is perforated on each side — the flanch with any number of small holes about the thirtieth part of an inch diameter extending to its hollow — on each side the flanch or nut the male screw is encircled by a small groove from which is made any number of very small grooves on the flanch or nut to its edge.

The lower chamber is filled with turpentine by means of a small tube extending from said chamber to the top of the lamp, And the upper chamber is filled with alcohol, thro an apertune at the top of the lamp In trimming my lamp I fill the turpentine tube with cotton wicking or any fibrous substance that will raise the turpentine by capillary attraction observing to let the wicking extend from the bottom of the tube and about three inches above it, I then wind cotton flannel or other wicking around that part of the wick, which extends above the tube till its size equals the alcohol tube I then wind around this week and the alcohol tube more cotton flannel or other wicking making them of sufficient size to fill the burner & insert them into it observing to let each wick come within almost one inch of the top of the burner. By means of a groove cut in each end of the male screw, that either end may be used the same may be screwed down more or less and the escape of the gas regulated varying the light at will the whole except the burner to be made of tin copper or other metal &. may be increased or diminished to any size or form — The burner must be made of copper, brass, or any metal that will endure heat.

What I claim as my invention is, the combination of said tubes the using the turpentine and alcohol of commerce and uniting them as above described in a state of vapour, and the use of the screw as above specified whereby the quantity of gas which escapes from the burner as also the quantity of light is regulated —— My invention is readily adapted to the common lamp when thus used I fill the common lamp with two parts turpentine and one part alcohol, The alcohol must be of sufficient strength to rise to the top, In the common lamp I have one tube only extending from near the bottom of the lamp into the burner. The burner is regulated at the top with screws as in the large lamp, In trimming the common lamp I fill this tube with cotton or other wicking & envelop this tube with cotton flannel or other wicking observing that the wick & flannel rises to within about one inch of the top of the burner, and that the flannel extends nearly to the bottom of the alcohol tube not to reach the turpentine, Either lamp is lighted by heating the top of the burner In testimony that the above is a true specification of my said invention as above described, I have hereto set my hand this twenty fourth day of February in the year of our Lord one thousand eight hundred and thirty four Witnesses { Asa Keyes
Wm C. Pyther Daniel Gilbert (957 words)

Exd.
[illegible]

(Granted March 29. 1834)